United States Patent
Matsui et al.

(10) Patent No.: US 7,650,811 B2
(45) Date of Patent: Jan. 26, 2010

(54) SHIFTING DEVICE

(75) Inventors: Kazuhito Matsui, Aichi (JP); Masahiro Taniguchi, Aichi (JP); Osamu Shoji, Aichi (JP); Noriyuki Suzuki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 123 days.

(21) Appl. No.: 11/851,980

(22) Filed: Sep. 7, 2007

(65) Prior Publication Data

US 2008/0006113 A1    Jan. 10, 2008

Related U.S. Application Data

(62) Division of application No. 10/642,950, filed on Aug. 18, 2003, now Pat. No. 7,293,480.

(30) Foreign Application Priority Data

Aug. 20, 2002  (JP) .............................. 2002-239433
Apr. 3, 2003   (JP) .............................. 2003-100719

(51) Int. Cl.
*B60K 17/04*   (2006.01)
*B60K 17/12*   (2006.01)
*G05G 9/00*    (2006.01)
*F16H 59/04*   (2006.01)

(52) U.S. Cl. .............. 74/473.12; 74/473.18; 74/473.21; 74/473.33

(58) Field of Classification Search ................ 74/473.1, 74/473.12, 473.18, 473.21, 473.3, 473.33
See application file for complete search history.

(56) References Cited

U.S. PATENT DOCUMENTS

| | | | |
|---|---|---|---|
| 3,768,328 A | 10/1973 | Campbell | |
| 4,022,078 A * | 5/1977 | Malott | ........................ 74/473.3 |
| 4,519,266 A | 5/1985 | Reinecke | |
| 5,005,411 A | 4/1991 | Miyagi et al. | |
| 5,179,867 A | 1/1993 | Sakakibara et al. | |
| 5,243,871 A | 9/1993 | Weiten | |
| 5,706,702 A | 1/1998 | Yamada | |
| 5,934,146 A | 8/1999 | Richard | |
| 6,415,677 B1 | 7/2002 | Skogward | |

(Continued)

FOREIGN PATENT DOCUMENTS

GB          2 319 312 A          5/1998

(Continued)

*Primary Examiner*—Thomas R Hannon
*Assistant Examiner*—Justin Krause
(74) *Attorney, Agent, or Firm*—Patterson, Thuente, Skaar & Christensen, P.A.

(57) ABSTRACT

A shifting device includes a housing, a shift lever, and a sensor unit. The shift lever is moved along frontward or rearward and leftward or rightward to select one of shift positions. The sensor unit is of a non-contact type and detects the selected shift position. The sensor unit includes a plurality of sensors and a magnet. The relative positions of the sensors and the magnet are variable. The sensor unit detects the selected shift position according to the relative positions. According to movement of the shift lever, at least one of the group of the sensors and the magnet is moved along a first movement axis and a second movement axis. The first and second movement axes extend in different directions.

11 Claims, 7 Drawing Sheets

U.S. PATENT DOCUMENTS

| | | |
|---|---|---|
| 6,530,293 B1 | 3/2003 | Ruckert et al. |
| 6,550,351 B1 * | 4/2003 | O'Reilly et al. ............... 74/335 |
| 6,629,473 B2 * | 10/2003 | Syamoto et al. ............... 74/523 |
| 6,718,842 B1 * | 4/2004 | Bofias ..................... 74/473.33 |
| 6,948,582 B2 | 9/2005 | Shiomi et al. |
| 7,219,572 B2 | 5/2007 | Syamoto |
| 2002/0056334 A1 | 5/2002 | Fujinuma |
| 2003/0098218 A1 * | 5/2003 | Syamoto ................. 192/220.4 |
| 2004/0237692 A1 | 12/2004 | Syamoto et al. |

FOREIGN PATENT DOCUMENTS

| | | |
|---|---|---|
| JP | 59-134825 | 9/1984 |
| JP | 62-128308 | 6/1987 |
| JP | 05-322038 | 12/1993 |
| JP | 06-323407 | 11/1994 |
| JP | 2001-105920 | 8/1995 |
| JP | 08-320064 | 12/1996 |
| JP | 2000-108707 | 4/2000 |
| JP | 2001-515188 | 9/2001 |
| JP | 2002-147586 | 5/2002 |
| JP | 2002089676 A | 3/2003 |

* cited by examiner

Fig.6(a)
P Position

Fig.6(b)
F Position

Fig.6(c)
D Position

Fig.6(d)
N Position

Fig.6(e)
R Position

Fig.7

Code of Signals from the Hall ICs

| Lever Position | IC38 | IC39 | IC40 | IC41 |
|---|---|---|---|---|
| P | H | H | H | L |
| F | H | L | H | H |
| D | L | H | H | H |
| N | H | H | L | H |
| R | H | L | L | L |

SHIFTING DEVICE

This application is a divisional of U.S. patent application Ser. No. 10/642,950, filed Aug. 18, 2003, entitled "Shifting Device" which claims priority to Japanese Patent Application No. 2002-239433, filed Aug. 20, 2002 and Japanese Patent Application No. 2003-100719, filed Apr. 3, 2003, priority to all of which are claimed and which are hereby incorporated by reference herein.

BACKGROUND OF THE INVENTION

The present invention relates to a shifting device for changing a shift position.

A typical vehicle having an automatic transmission has a floor shifting device. A shifting device has a shift lever for switching the gear position of the automatic transmission. Some shifting devices provide manual gear selection as well as automatic gear selection. Such a shifting device typically has a several gates formed in a panel. For example, such a shifting device has a first gate for automatic gear selection, a second gate for manual gear selection, and a third gate for switching between the automatic and manual gear selections.

In the automatic gear selection, a driver moves the shift lever to the first gate and shifts the shift lever to one of a P (parking) position, an R (reverse) position, an N (neutral) position, and a D (advance) position. Accordingly, the gear position of the automatic transmission is changed. In the manual gear selection, the driver moves the shift lever from the first gate to the second gate via the third gate, and selectively moves the shift lever toward M+ position (shift up position) and M− position (shift down position). Accordingly, the gear position of the automatic transmission is manually shifted by one gear at a time.

Figure 12:
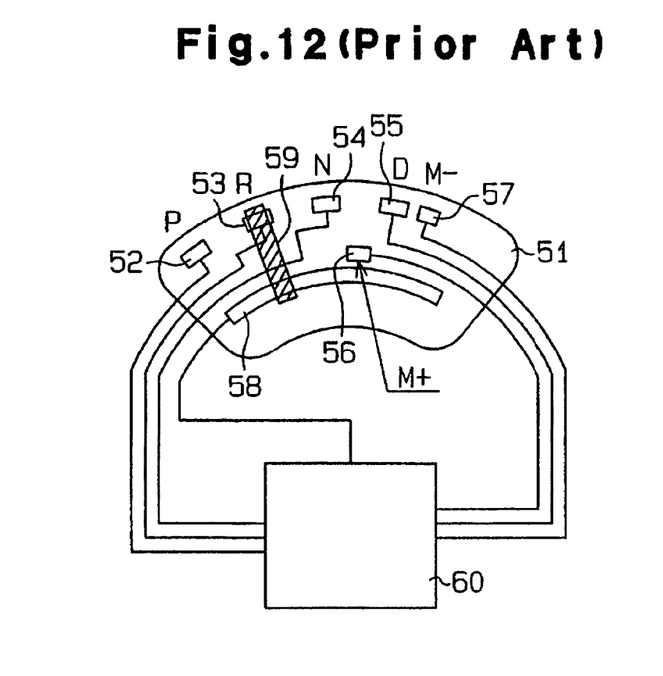
FIG. 12 is a diagrammatic view showing an electrical circuit of a prior art shifting device.

FIG. 12 is a block diagram of an electrical circuit of a shifting device disclosed in Japanese Laid-Open Patent Publication No. 2002-89676. The shifting device includes a switch main body 51 mounted on a vehicle body. The switch main body 51 has a P contact 52, an R contact 53, an N contact 54, a D contact 55, a shift-up contact 56, and a shift-down contact 57. A negative electrode 58 extends arcuately along the switch main body 51. A shift lever (not shown) has a contact electrode 59, which electrically connects one of the contacts 52 to 57 with the negative electrode 58.

For example, when the shift lever is at the P position, the contact electrode 59 contacts the P contact 52 and the negative electrode 58, thereby electrically connecting the P contact 52 and the negative electrode 58 to each other. Accordingly, a controller 60 determines that the shift lever is at the P position, and switches the gear position of the automatic transmission to the P position. When the shift lever is at any of the R, N, D positions, the controller 60 operates in a similar manner.

When the driver moves the shift lever to the second gate, a position detecting switch (not shown) is turned on. The position detecting switch continues to be on during the manual gear selection. During the manual gear selection, the contact electrode 59 contacts one of the shift-up contact 56 and the shift-down contact 57, and the negative electrode 58. Based on the contacting state of the negative electrode 58 with one of the shift-up and shift-down contacts 56, 57, and an ON signal from the position detecting switch, the controller 60 detects one of a shift-up manipulation and a shift-down manipulation. The controller 60 then changes the gear position of the automatic transmission according to the shift position.

This shifting device is of a contact type, in which the position of the shift lever is detected based on the contact state of the negative electrode 58 with the contacts 52 to 57 with the contact electrode 59. However, if the shifting device is used for an extended period, the contact electrode 59 and the contacts 52 to 59 deteriorate with time due to wear. Therefore, the method using this shifting device has low reliability as a method for detecting the position of the shift lever.

SUMMARY OF THE INVENTION

Accordingly, it is an objective of the present invention to provide a shifting device that improves the reliability of detection of the position of a shift lever.

To achieve the foregoing and other objectives and in accordance with the purpose of the present invention, a shifting device having a housing, a shift lever supported by the housing, a non-contact type position detection mechanism, and a moving mechanism is provided. The shift lever is moved at least along a first manipulation axis and a second manipulation axis to select one of shift positions. The first and second manipulation axes extend in different directions. The non-contact type position detecting mechanism detects a shift position selected by the shift lever. The position detecting mechanism includes a plurality of detecting devices and a detection objective device. The relative positions between the detecting devices and the detection objective device are variable. The position detecting mechanism detects the selected shift position according to the relative positions. According to movement of the shift lever, the moving mechanism moves at least one of the group of the detecting devices and the detection objective device at least along a first movement axis and a second movement axis. The first and second movement axes extend in different directions.

The present invention also provides a shifting device having a housing, a shift lever supported by the housing, a position detecting mechanism, a reflector member, and a moving mechanism. The shift lever is moved at least along a first manipulation axis and a second manipulation axis to select one of shift positions. The first and second manipulation axes extend in different directions. The position detecting mechanism has a plurality of light emitting portions and a plurality of photoreceptor portions for detecting light emitted by the light emitting portions. Each photoreceptor portion forms a pair with one of the light emitting portions. The relative positions between the light emitting portions and the photoreceptor portions are variable. The position detecting mechanism detects the selected shift position according to the relative positions. The reflector member reflects light emitted by the light emitting portions so that the reflected light is detected by the photoreceptor portions. A plurality of holes are formed in the reflector member such that the photoreceptor portions detect signals corresponding to the selected shift position. According to movement of the shift lever, the moving mechanism moves at least one of the group of the light emitting portions and the group of the photoreceptor portions at least along a first movement axis and a second movement axis. The first and second movement axes extend in different directions.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A shifting device 1 according to a first embodiment of the present invention will now be described with reference to C FIGS. 1 to 7. The front, the rear, the left, and the right of the shifting device 1 are defined as shown in FIGS. 1 and 2 in this embodiment.

Figure 1:
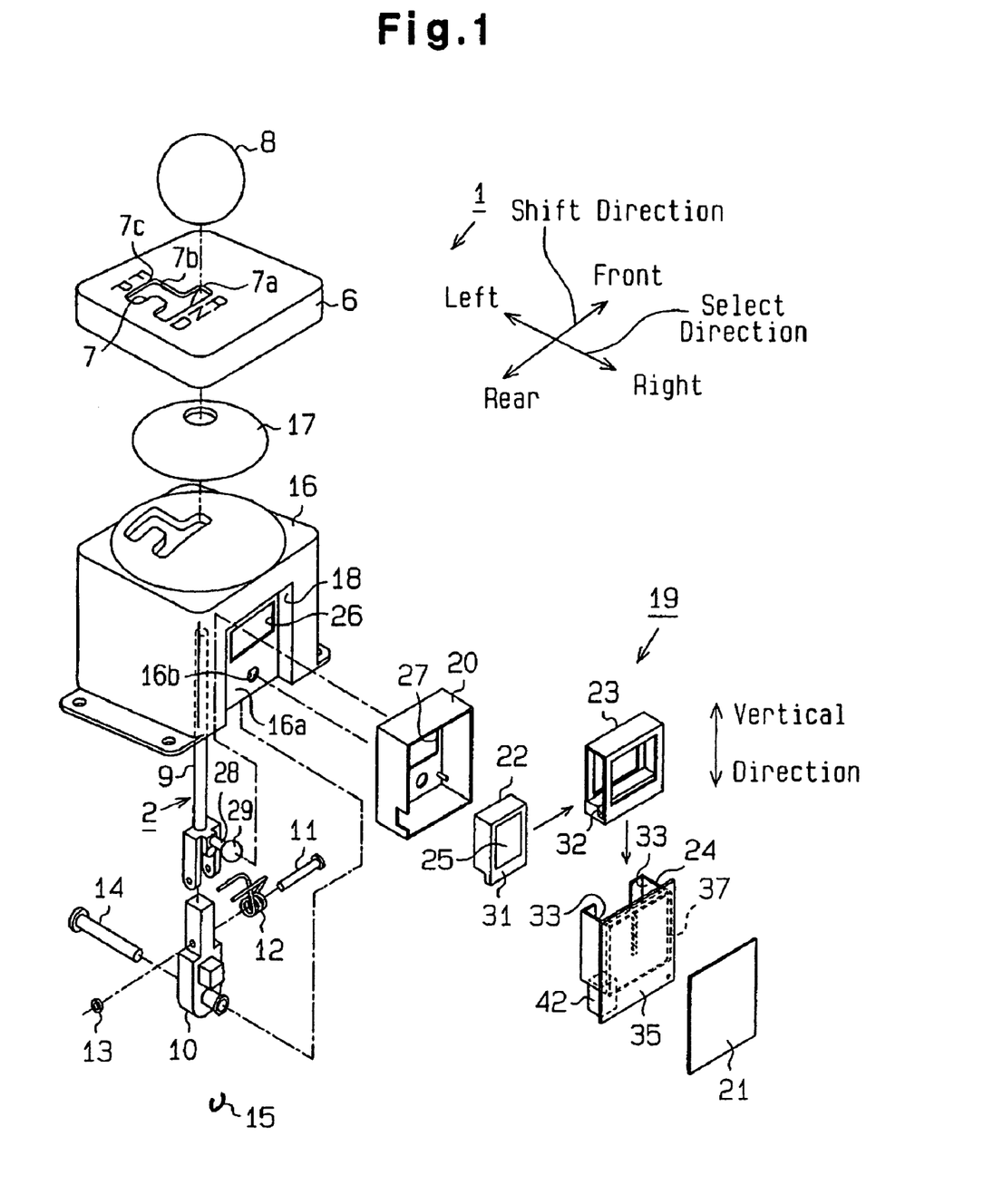
FIG. 1 is an exploded perspective view illustrating a shifting device according to a first embodiment of the present invention.
Figure 2:
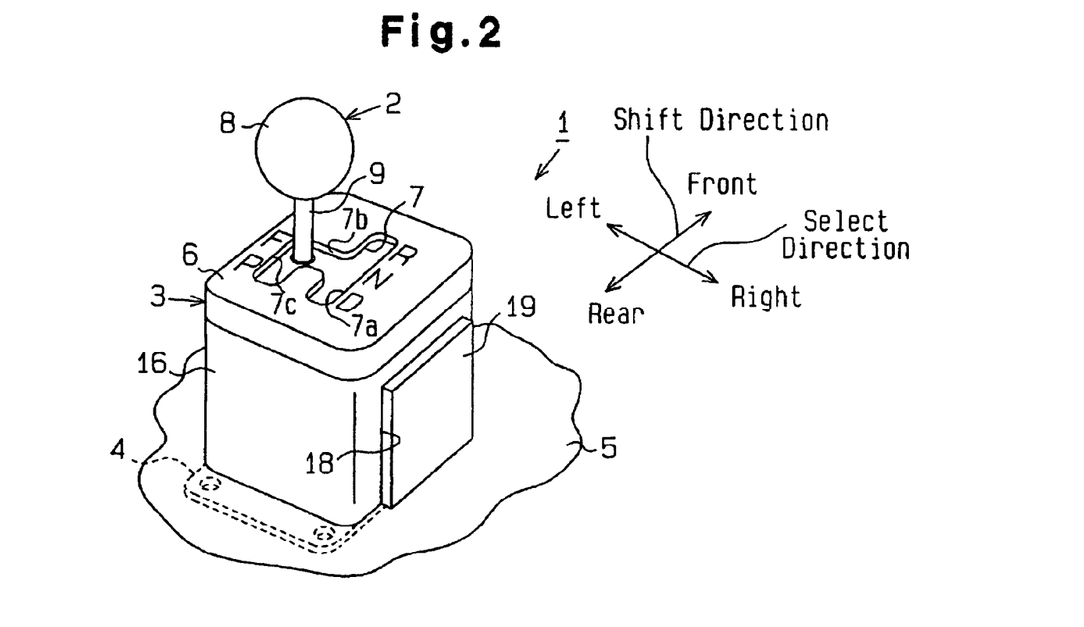
FIG. 2 is a perspective view illustrating the shifting device shown in FIG. 1.

As shown in FIG. 1, the shift lever 2 includes the knob 8, a lever main body 9, and a retainer 10. The lever main body 9 is pivotally coupled to the retainer 10 with a pin 11. Thus, the shift lever 2 is supported by the retainer 10 to be pivotable leftward and rightward about the pin 11. The torsion spring 12 is engaged with a shaft of the pin 11. The torsion spring 12 urges the shift lever 2 toward the F position when the shift lever 2 is in the first gate 7a. A nut 13 is threaded to the distal portion of the pin 11 to prevent the pin 11 from falling off.

A shaft 14 extends through a lower portion of the pin 11. The shaft 14 extends in a direction perpendicular to the direction of the pin 11. The shaft 14 is supported by the housing 16. The retainer 10 pivots about the shaft 14. The shift lever 2 is moved in the shift direction about the shaft 14. A nut 15 is threaded to the distal portion of the shaft 14 to prevent the shaft 14 from falling off. A dome-shaped slide cover 17 is located between the cover plate 6 and the housing 16. The slide cover 17 moves synchronously with the shift lever 2.

A sensor recess 18 is formed on the outer surface of a right sidewall 16a of the housing 16. A sensor unit 19 is attached to the sensor recess 18. The sensor unit 19 functions to detect the position of the shift lever 2. The sensor unit 19 has an outer case 20 and a cover 21. The outer case 20 accommodates a resin inner case 22, a first holder 23, and a second holder 24. The first holder 23 holds a magnet 25, and the second holder 24 holds the first holder 23. The sensor unit 19 is of a slide type in which the magnet 25 is moved along crossing directions in accordance with manipulation of the shift lever 2.

A rectangular first window 26 is formed in the upper portion of the right sidewall 16a of the housing 16. A second window 27 is formed in the upper portion of the outer case 20 of the sensor unit 19. The second window 27 faces the first window 26 and has substantially the same area as the first window 26. A coupler portion 28 is integrally formed with the lever main body 9. The coupler portion 28 extends from the lower portion of the lever main body 9 toward the sensor unit 19. When the shift lever 2 is assembled, the coupler portion 28 protrudes to the interior of the outer case 20 through the first and second windows 26, 27. A distal end 29 of the coupler portion 28, which is substantially spherical, is engaged with a hole 30 formed in the inner case 22 (see FIG. 3). In this embodiment, the inner case 22, the first holder 23, the second holder 24, and the coupler portion 28 form a moving mechanism.

A detected member, which is the magnet 25, is engaged with the inner case 22 such that part of the magnet 25 is exposed. The magnet 25 is a shaped as a flat plate and is made of a magnetic material (ferrite, neodymium). The magnet 25 has north poles and south poles. The inner case 22 has a guide portion 31 extending along the shift direction. In this embodiment, the magnet 25 forms a part of the position detecting mechanism.

The first holder 23 is substantially shaped as a rectangular parallelepiped and has an opening. A guide groove 32 is formed in an inner surface of the first holder 23. The guide groove 32 corresponds to the guide portion 31 and extends in the front-rear direction, or in a first movement axis. The inner case 22 is accommodated in the first holder 23 with the guide portion 31 of the inner case 22 engaged with the guide groove 32 of the first holder 23. The guide portion 31 of the inner case 22 moves along the guide groove 32 of the first holder 23.

Figure 3:
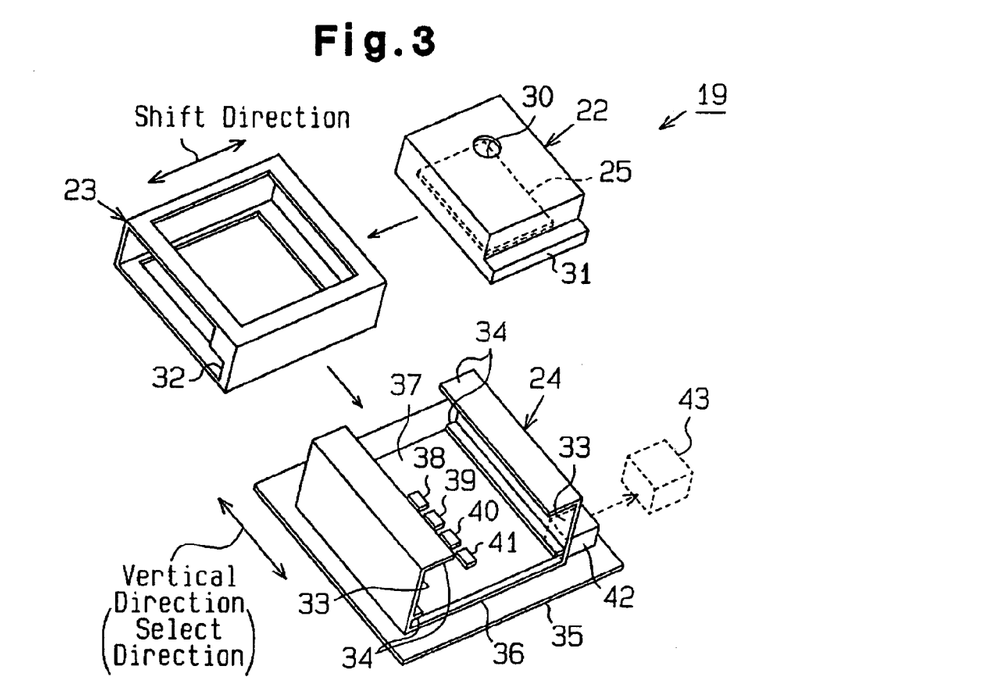
FIG. 3 is an exploded perspective view illustrating a sensor unit accommodated in the shifting device shown in FIG.

The second holder 24 has vertically extending two rails 33, a coupling plate 36 for coupling the rails 33 to each other, and a base plate 37 attached to the coupling plate 36. The vertical direction in this embodiment is a direction parallel to the axial direction of the lever 9 (see FIG. 1), or a direction along which the magnet 25 is moved when the shift lever 2 is moved leftward or rightward, or in a second movement direction. As shown in FIG. 3, each rail 33 has two extension plate 34 extending along the vertical direction. The first holder 23 is accommodated in the second holder 24 while being held between the extension plates 34 of each rail 33. In this state, the first holder 23 is movable in the vertical direction. An installation plate 35 is attached to the second holder 24. The installation plate 35 is fixed to the outer case 20 (see FIG. 1).

As shown in FIG. 2, the shifting device 1 includes a shift lever 2 and a housing 16. The housing 16 has flanges 4 at the lower end. The housing 16 is fixed to a floor console 5 by fastening the flanges 4 to the floor console 5 with screws (not shown). The upper portion of the housing 16 is covered with a cover plate 6. A shift gate opening 7 is formed in the cover plate 6. A shift lever 2 extends upward through the shift gate opening 7. A spherical shift knob 8 is attached to the upper end of the shift lever 2.

The shift gate opening 7 includes a first gate 7a extending in the front-rear direction, a second gate 7b extending leftward from a center of the first gate 7a, and a third gate 7c extending rearward from the left end of the second gate 7b. The shift lever 2 is capable of moving along the shift gate opening 7. As the shift lever 2 is moved, the engagement condition of an automatic transmission of an A/T vehicle is switched. Specifically, the shift lever 2 is moved to any of a P (parking) position, an F (free) position, an N (neutral) position, and a D (drive) position. The shift lever 2 is manipulated frontward or rearward, or in a first manipulation axis (along a shift direction (see FIG. 2)) either in the first gate 7a, which includes the R, N, D positions, or in the third gate 7c, which includes the F, P positions. When switched between the first gate 7a and the third gate 7c, the shift lever is manipulated leftward or rightward, or in a second manipulation axis, (along a select direction (see FIG. 2)). When manipulated from the P position, the shift lever 2 is moved to the F position. When manipulated from the P position, the shift lever 2 is moved to the F position. Also, after being moved to any of the R, N, D positions, the shift lever 2 is moved back to the F position. Specifically, when the shift lever 2 is manipulated from the F position to the P position, the shift lever 2 is held at the P position by a member that is not illustrated. When the shift lever 2 is manipulated from the F position to any of the R, N, D positions, first to fourth Hall ICs 38 to 41 detect the position of the shift lever 2. Accordingly, the shifting device 1 is switched. (The Hall ICs 38 to 41 will be described below.) Thereafter, when the driver releases the shift lever 2, the shift lever 2 is returned to the F position by the force of the torsion spring 12. That is, the shift lever 2 is not held at any of the R, N, and D positions. The shift lever 2 may be designed to return to the F position after being manipulated to the P position.

Figure 4:
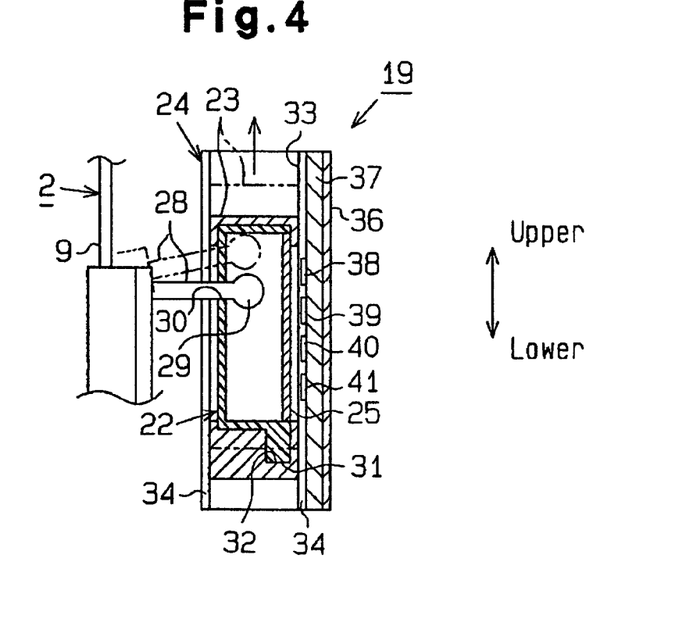
FIG. 4 is a diagrammatic cross-sectional view showing the sensor unit shown in FIG. 3.

When the coupler portion 28 is at a position shown by a solid line in FIG. 4, the shift lever 2 is in the first gate 7a. For example, suppose that the driver moves the shift lever 2 leftward to the third gate 7c. At this time, the distal end 29 of the coupler portion 28 is moved upward. Accordingly, the first holder 23 is moved upward, and the coupler portion 28 is moved to a position shown by an alternate long and short dash line in FIG. 4. When the shift lever 2 is moved from the third gate 7c to the first gate 7a, the first holder 23 is moved downward and is returned to the position shown by the solid lines.

As shown in FIGS. 3 and 4, detecting members, which are the first to fourth Hall ICs 38 to 41 are located on the surface of the base plate 37 of the second holder 24. The first to fourth Hall ICs 38 to 41 are arranged along the vertical direction and spaced at substantially equal intervals. When the first holder 23 is accommodated in the second holder 24, the magnet 25 of the inner case 22 faces the first to fourth Hall ICs 38 to 41. When detecting a north pole of the magnet 25, the first to fourth Hall ICs 38 to 41 output an H signal. When detecting a south pole of the magnet 25, the first to fourth Hall ICs 38 to 41 output an L signal. A connector 42 is attached to the surface of the installation plate 35. A controller 43 mounted on the vehicle is connected to the connector 42. In this embodiment, the first to fourth Hall ICs 38 to 41 form part of the position detecting mechanism.

Figure 5:
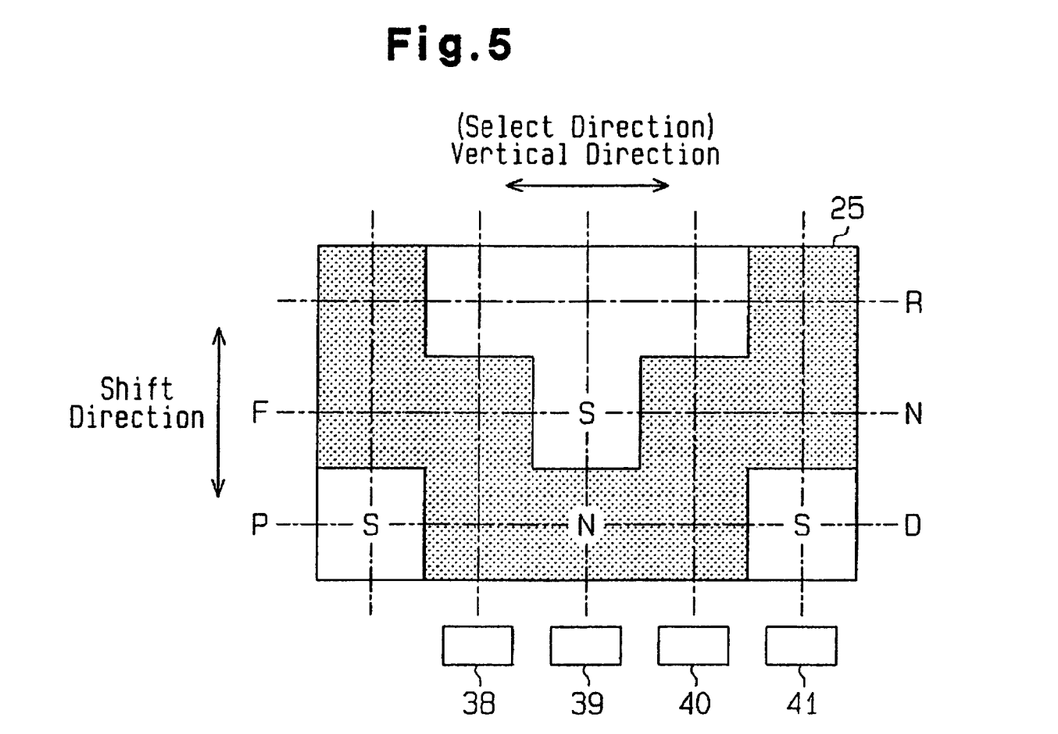
FIG. 5 is a plan view showing a magnetization pattern of a magnet.
Figure 6A:
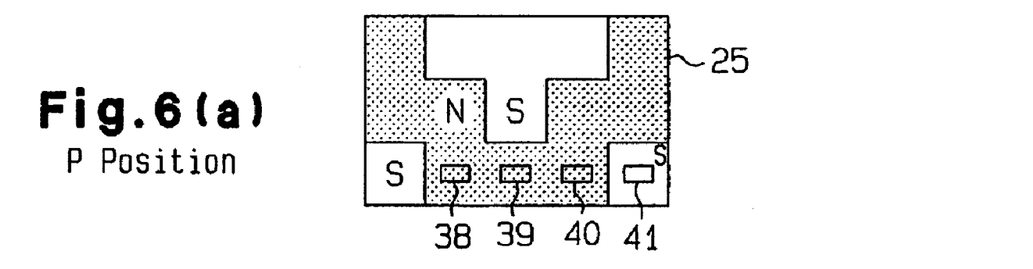
FIGS. 6(a) to 6(e) are diagrams showing the relationship between a magnet and Hall ICs.
Figure 6B:
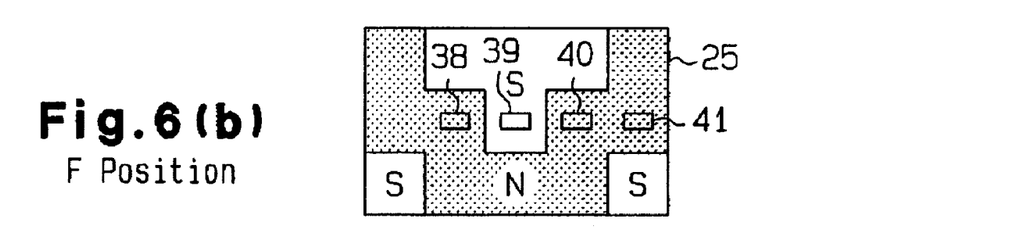
Figure 6C:
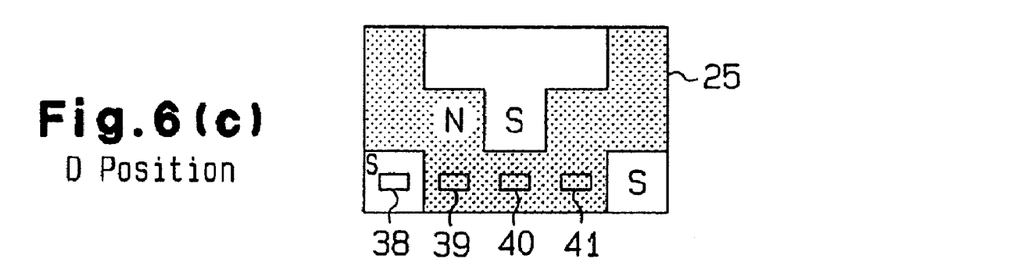

FIG. 5 is a plan view showing a magnetization pattern of a magnet. The surface of the magnet 25 is divided into fifteen magnetic pole sections in three lateral lines and five vertical columns. As the shift lever 2 is manipulated, some of the magnetic pole sections of the magnet 25 face the first to fourth Hall ICs 38 to 41. Specifically, as shown in FIGS. 6(a) to 6(e), the relationship between the magnetic pole sections of the magnet 25 and the first to fourth Hall ICs 38 to 41 is changed according to the position of the shift lever 2. As shown in FIG. 7, the signals (H signals and L signals) of the first to fourth Hall ICs 38 to 41 form different codes each corresponding to one of the positions of the shift lever 2.

Even if any one of the first to fourth Hall ICs 38 to 41 malfunctions, the codes of signals from the Hall ICs 38 to 41 are different for each of the R. N, D, F, and P positions. Further, the output values of the Hall ICs 38 to 41 for the R position of the shift lever 2 are the reverse of the output values for the D position. That is, if the output values of the Hall ICs 38 to 41 are H, L, L, L signals when the shift lever 2 is at the R position, the output values are L, H, H, H signals when the shift lever 2 is at the D position.

An operation of the shifting device 1 will now be described with reference to FIGS. 6(a) to 7. Suppose that the shift lever 2 is initially at the P position, and then moved to the F position. When the shift lever 2 is at the P position, the relationship between the magnet 25 and the Hall ICs 38 to 41 is in a state shown in FIG. 6(a), and the Hall ICs 38 to 41 output an H signal, an H signal, an H signal, and an L signal (see FIG. 7), respectively.

When the driver moves the shift lever 2 frontward to the F position, the inner case 22 and the magnet 25 are moved frontward relative to the first holder 23, accordingly. When the shift lever 2 is moved to the F position, the relationship between the magnet 25 and the Hall ICs 38 to 41 is in a state shown in FIG. 6(b), and the Hall ICs 38 to 41 output an H signal, an L signal, an H signal, and an H signal (see FIG. 7), respectively.

Subsequently, when the driver moves the shift lever 2 rightward from the F position to the N position, the inner case 22, the first holder 23, and the magnet 25 are moved vertically relative to the second holder 24, accordingly. When the shift lever 2 is moved to the D position, the relationship between the magnet 25 and the Hall ICs 38 to 41 is in a state shown in FIG. 6(c), and the Hall ICs 38 to 41 output an L signal, an H signal, an H signal, and an H signal (see FIG. 7), respectively.

Figure 6D:
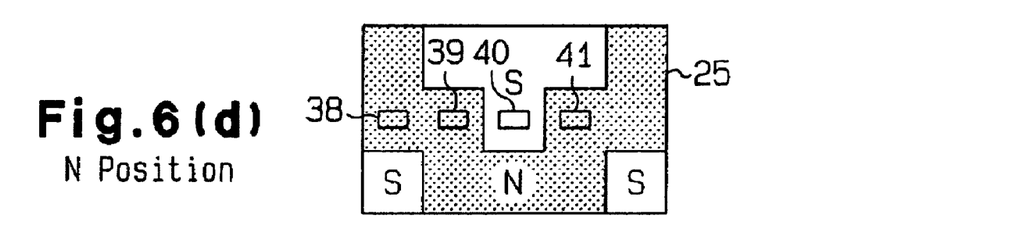
Figure 6E:
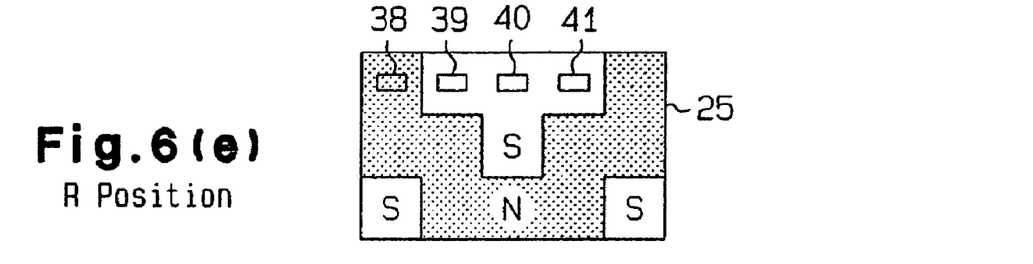
Figure 7:
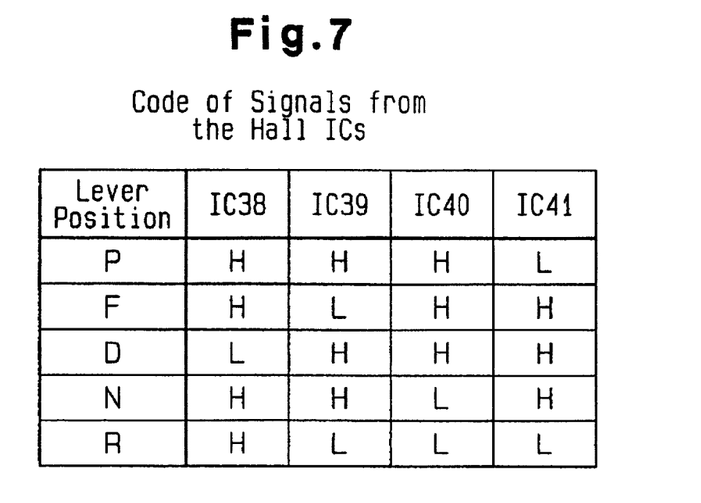
FIG. 7 is a chart showing output codes of Hal ICs.

When the driver moves the shift lever 2 to the N position or the R position, the relationship between the magnet 25 and the Hall ICs 38 to 41 is in a state shown in FIGS. 6(d) and 6(e), respectively, and output codes corresponding to the N position and the R position shown in FIG. 7 are outputted. Based on the output code of the signals from the Hall ICs 38 to 41, which varies depending on the relationship between the magnet 25 and the Hall ICs 38 to 41, the controller 43 determines the position of the shift lever 2.

This embodiment provides the following advantages.

When the shift lever 2 is moved frontward or rearward, the magnet 25 is moved frontward or rearward, accordingly. When the shift lever 2 is moved leftward or rightward, the magnet 25 is moved upward or downward, accordingly. The non-contact type sensor formed of the magnet 25 and the first to fourth Hall ICs 38 to 41 detects changes of the position of the shift lever 2 in the lateral direction and the front-rear direction. Therefore, if the sensor is used for an extended period, the sensor hardly deteriorates with time. Further, the reliability of the position detection of the shift lever 2 is improved. Compared to a contact type sensor, the number of components is reduced.

Even if one of the four Hall ICs 38 to 41 malfunctions, the controller 43 is capable of detect the position of the shift lever 2 based on signals from the other three Hall ICs. That is, the magnetization pattern of the magnet 25 is determined such that, even if any one of the first to fourth Hall ICs 38 to 41 malfunctions, the codes of signals from the Hall ICs 38 to 41 are different for each of the R, N, D, F, and P positions. Therefore, even if one of the four Hall ICs 38 to 41 malfunctions, the position of the shift lever 2 is accurately detected, and the reliability of the position detection of the shift lever 2 is further improved.

In some cases, if the driver slowly manipulates the shift lever 2, the output values of the Hall ICs 38 to 41 do not change simultaneously due to variations of the magnetization state of the magnet 25 and the deviation of the position of the Hall ICs 38 to 41 from the designed positions. In such cases, the same code may be outputted for different positions of the shift lever 2. However, in this embodiment, the magnet 25 is magnetized such that the output values of the Hall ICs 38 to 41 for the R position of the shift lever 2 are the reverse of the output values for the D position. Therefore, a movement of the shift lever 2 from the N position to the R position is not erroneously detected as a movement from the N position to the D position. Particularly, if the D position is erroneously detected as the R position or vice versa, the vehicle can move in the direction opposite from a desired direction. This embodiment eliminates the possibility of such errors.

The inner case 22, to which the magnet 25 is attached, is accommodated in the first holder 23, and the first holder 23 is accommodated in the second holder 24. The size of the sensor unit 19 is reduced. Accordingly, the size of the shifting device 1 is reduced.

When the shift lever 2 is moved frontward of rearward, the magnet 25 (the first holder 23) is moved vertically relative to the second holder 24. Thus, the lateral size of the shifting device 1 is reduced.

The position of the shift lever 2 is detected with the magnet 25 and the Hall ICs 38 to 41 in this embodiment. Compared to a case where an optical rotary encoder is used, this embodiment has a simpler configuration.

A second embodiment of the present invention will now be described with reference to FIGS. 6 to 10. The second embodiment is the same as the first embodiment except for a method for detecting the position of the shift lever 2. Therefore, the same reference numerals are given to those components that the same as the corresponding components of the first embodiment.

Figure 8:
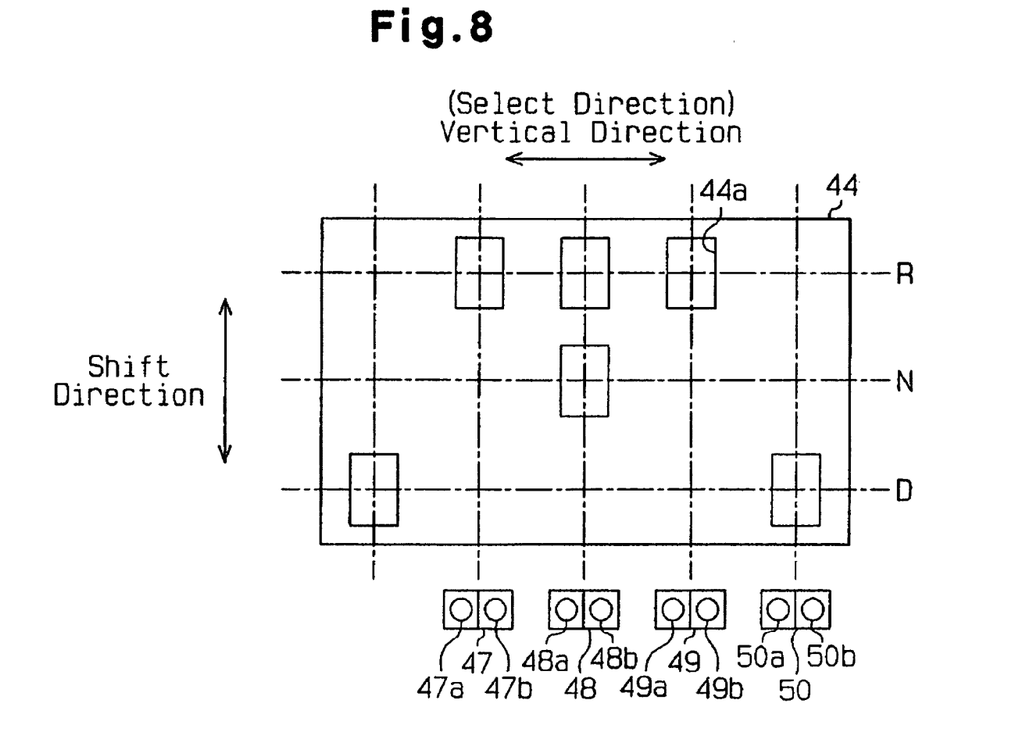
FIG. 8 is a plan view illustrating a reflector plate and photosensors according to a second embodiment of the present invention.

As shown in FIG. 8, a reflecting member, which is reflector plate 44 in this embodiment, is located on the inner case 22 (see FIG. 1) instead of the magnet 25. Through holes 44a are formed in the reflector plate 44. The positions of the through holes 44a correspond to the magnetic pole sections of south poles when the magnet 25 is used. The through holes 44a are formed with a press. Instead of the first to fourth Hall ICs 38 to 41, a plurality of position detecting members, which are first to fourth reflecting photosensors 47 to 50, are located on the surface of the base plate 37.

Figure 9:
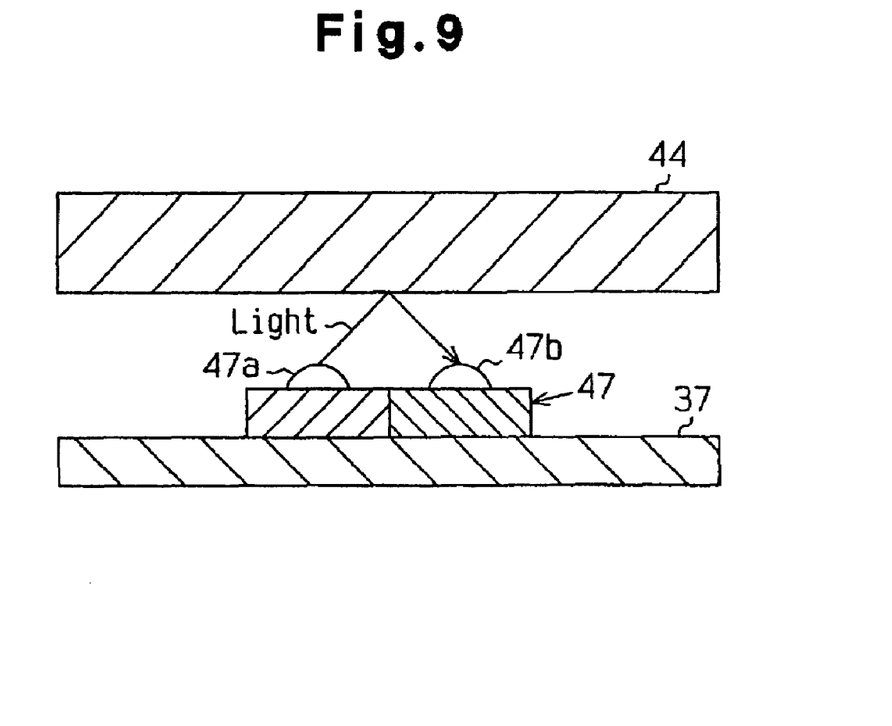
FIG. 9 is a diagrammatic view showing a state in which light from the photosensors is reflected by the reflector plate of FIG. 8.
Figure 10:
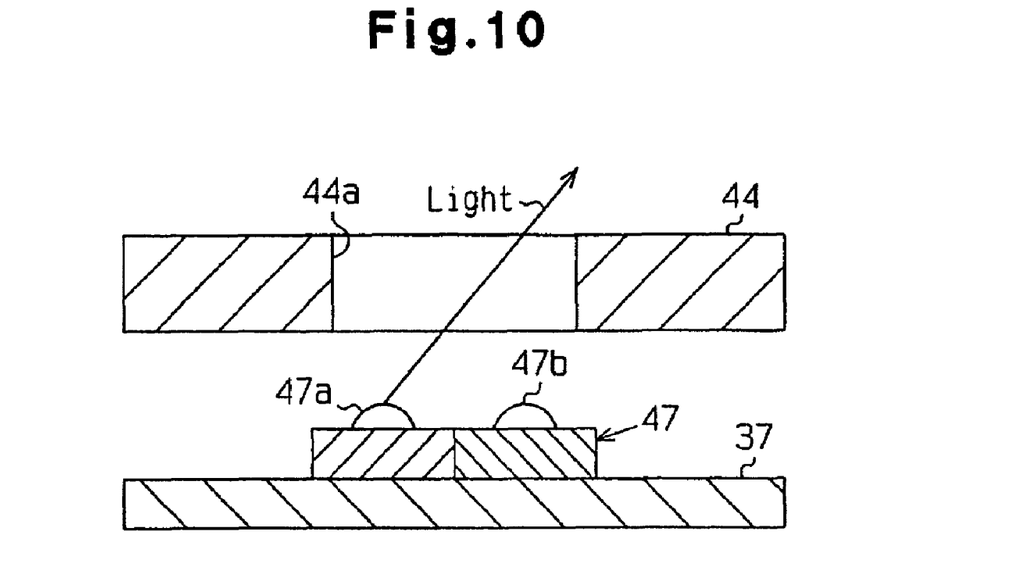
FIG. 10 is a diagrammatic view showing a state in which light from the photosensors passes through the reflector plate of FIG. 8.

The photosensors 47 to 50 are packaged photo reflectors, each having the corresponding one of first to fourth light emitting elements 47a to 50a, and the corresponding one of first to fourth photoreceptors (detecting portions) 47b to 50b. The light emitting elements 47a to 50a and the photoreceptors 47b to 50b are arranged in the same direction. The light emitting elements 47a to 50a may be inclined relative to the photoreceptors (detecting portions) 47b to 50b. As shown in FIG. 9, when light from the first light emitting element 47a is reflected by the reflector plate 44, and the reflected light is detected by the first photoreceptor 47b in the same package, the first photosensor 47 outputs an H signal. As shown in FIG. 10, when light from the first light emitting element 47a passes through one of the through holes 44a, and the first photoreceptor 47b in the same package does not detects the light, the first photosensor 47 outputs an L signal. The other photosensors 48 to 50 operate in the same manner, and detailed description is therefore omitted.

The through holes 44a are arranged such that the codes of signals from the photosensors 47 to 50 vary according to the position of the shift lever 2. Even if any one of the photosensors 47 to 50 malfunctions, the codes of signals from the photosensors 47 to 50 are different for each of the R, N, D, F, and P positions. Further, the through holes 44a are arranged such that the output values of the photosensors 47 to 50 for the R position of the shift lever 2 are the reverse of the output values for the D position.

When the shift lever 2 is moved to the P position by the driver, the first to third photosensors 47 to 49 output H signals, and the fourth photosensor 50 outputs an L signal. Based on the code of the signal, the controller 43 determines that the shift lever 2 is at the P position. When the shift lever 2 is manipulated to any of the F, D, N, R positions, the photosensors 47 to 49 output signals corresponding to the position of the shift lever 2. Based on a code formed of the outputted signals, the controller 43 determines the position of the shift lever 2.

In addition to the advantages of the embodiment shown in FIGS. 1 to 7, this embodiment provides the following advantages.

In a case where photosensors in which light emitting elements and photoreceptors are separately formed, the light emitting elements need to be attached to the inner case 22, and the photoreceptors 37 need to be attached to the base plate 37. However, in this embodiment, since the light reflecting type photosensors 47 to 49 are used, the light emitting elements and the photoreceptors are attached to one of the inner case 22 and the base plate 37. Therefore, the number of steps of mounting the photosensors is reduced. Each of the first to fourth light emitting elements 47a to 50a and the corresponding one of the first to fourth photoreceptors 47b to 50b are accommodated in a single package to form the corresponding one of the first to fourth photosensors 47 to 50. Therefore, each of the photosensors 47 to 50 is mounted to the sensor unit 19 in a single process. This reduces the cost for mounting.

In a case of the magnetic sensor, the magnet 25 is provided with the magnetization pattern of north poles and south poles. In this case, a magnetization yoke needs to be produced. This increases the costs. However, in this embodiment, it only requires that the through holes 44a be formed in the reflector plate 44 using a press. This reduces the costs. Further, some magnetic type sensors have a magnetic shield to block external magnetic field, which increases the costs. However, the optical sensor as described in this embodiment requires no such increase in the costs.

Compared to magnetic type sensors, optical type sensors are faster in response. Therefore, the position detecting method of this embodiment, which is of an optical type, permits the position of the shift lever 2 to be quickly detected.

It should be apparent to those skilled in the art that the present invention may be embodied in many other specific forms without departing from the spirit or scope of the invention. Particularly, it should be understood that the invention may be embodied in the following forms.

Figure 11:
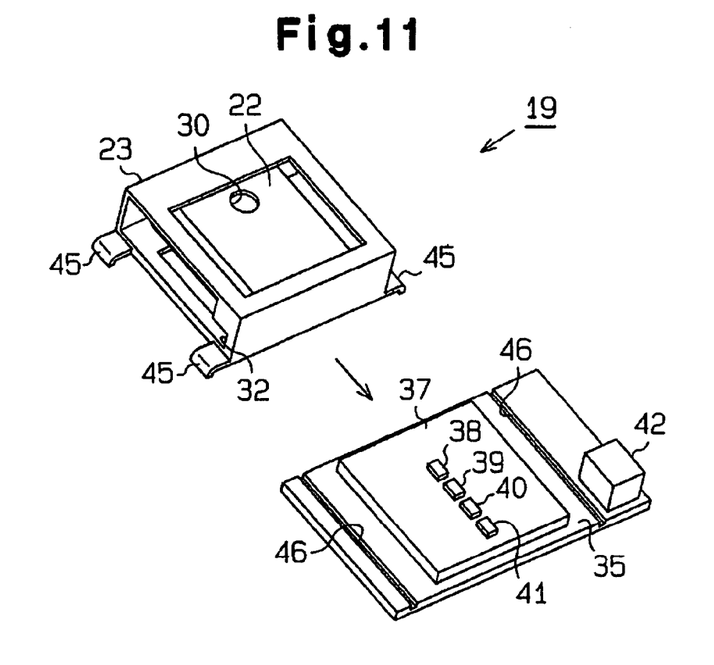
FIG. 11 is an exploded perspective view illustrating the interior of a sensor unit according to another embodiment.

In the embodiments of FIGS. 1 to 10, the structure including the second holder 24 permits the first holder 23 to move vertically relative to the base plate 37. However, a structure without the second holder 24 may be used. For example, a structure shown in FIG. 11 may be used. In this structure, two engaging portions 45 are formed at each side of the first holder 23. Each engaging portion 45 is bent toward the base plate 37. A rail portion 46 is formed in each side section of the installation plate 35. The rail portions 46 are capable of receiving the engaging portions 45. The engaging portions 45 are engaged with the rail portions 46 to permit the first holder 23 to move along the rail portions 46. Accordingly, the magnet 25 (the reflector plate 44) is moved vertically.

In the embodiments of FIGS. 1 to 10, the magnet 25 (the reflector plate 44) need not be slid along crossing directions. For example, the magnet 25 (the reflector plate 44) may be of rotor type. In this case, the magnet 25 is shaped arcuate, and, when the shift lever 2 is manipulated along the shift direction, the magnet 25 is pivoted about the shaft 14.

In the embodiment of FIGS. 1 to 7, the magnetization pattern of the magnet 25 is not limited to the one that is described as long as the code of signals outputted by Hall ICs 38 to 41 allows the position of the shift lever 2 to be detected. Also, in the embodiment of FIGS. 8 to 10, the pattern of the through holes 44a may be changed as necessary.

In the embodiment of FIGS. 1 to 7, the magnetization pattern of the magnet 25 need not be determined such that, even if one of the Hall ICs 38 to 41 malfunctions, the position of the shift lever 2 is detected. Further, the magnetization pattern of the magnet 25 need not be determined such that the output values of the Hall ICs 38 to 41 for the R position of the shift lever 2 are the reverse of the output values for the D position. In the embodiment of FIGS. 8 to 10, the pattern of the through holes 44a need not be determined such that the output values of the photosensors 47 to 50 for the R position of the shift lever 2 are the reverse of the output values for the D position.

In the embodiment of FIGS. 1 to 7, the media for detecting the magnet 25 are not limited to Hall ICs. For example, magnetic resistance elements such as magneto resistive effect elements or giant magneto resistive elements may be used.

In the embodiment of FIGS. 8 to 10, each of the light emitting elements 47a to 50a are accommodated in the same package with the corresponding one of the photoreceptors 47b to 50b to form the photosensors 47 to 50. However, other configurations may be adapted. For example, an optical encoder may be used. In this case, shielding plate having holes of a predetermined pattern is attached to the shift lever 2, and the position of the shift lever 2 is detected based on light reception pattern through the holes. In the embodiments of FIGS. 1 to 10, the position detecting member is not limited to magnetic type or optical type, but may be a non-contact detecting member that uses sound.

In the embodiments of FIGS. 1 to 10, the positions of the shift lever 2 is not limited to five positions, which are P, F, D, N, and R positions. For example, another shift position may be provided at a position next to the F position opposite from the P position. In this case, the number of the shift position of the shift lever 2 is six.

In the embodiments of FIGS. 1 to 10, the magnet 25 (the reflector plate 44) is attached to the shift lever 2, and the Hall ICs 38 to 41 (the photosensors 47 to 50) are attached to the vehicle body. However, this arrangement may be reversed.

In the embodiments of FIGS. 1 to 10, the inner case 22 need not be coupled to the lever main body 9 with the coupler portion 28. For example, the magnet (the reflector plate 44) may be arranged to move in the same direction as the shift lever 2. In this case, the magnet 25 (the reflector plate 44) may be fixed to the lever main body 9.

In the embodiment of FIGS. 1 to 7, the Hall ICs 38 to 41 may output an L signal when detecting a north pole, and output an H signal when detecting a south pole. In the embodiment of FIGS. 8 to 10, the photosensors 47 to 50 may output an L signal when detecting light, and output an H signal when detecting no light.

In the embodiments of FIGS. 1 to 10, the position of the coupler portion 28 is not limited to a lower portion of the lever main body 9. For example, the coupler portion 28 may be formed at a center of the lever main body 9.

In the embodiments of FIGS. 1 to 10, the shifting device 1 is applied to a vehicle. However, as long as applied to a system that uses the shift lever 2 to determine the shift position, the shifting device 1 may be applied to any type of system.

The present examples and embodiments are to be considered as illustrative and not restrictive and the invention is not to be limited to the details given herein, but may be modified within the scope and equivalence of the appended claims.

The invention claimed is:

1. A shifting device, comprising:
   a housing;
   a shift lever supported by the housing, wherein the shift lever is movable along a first manipulation axis in a first direction and in a second direction opposite to the first direction, and further along, at least, a second manipulation axis in a third direction, for selecting one of a plurality of shift positions along each of the manipulation axes, where the first and second manipulation axes are non-parallel;
   a non-contact position detecting mechanism capable of detecting said plurality of shift positions of the shift lever along each of the manipulation axes, wherein the position detecting mechanism includes a plurality of detecting devices and a reflector member, wherein relative positions between the detecting devices and the reflector member are variable, and wherein the position detecting mechanism detects a selected shift position according to the relative positions; and
   a moving mechanism, wherein, according to movement of the shift lever, the moving mechanism moves at least one of the plurality of detecting devices and the reflector member at least along a first movement axis and a second movement axis, the first and second movement axes are non-parallel,
   wherein each of the detecting devices includes a pair of a light emitting portion and a photoreceptor portion, wherein the reflector member reflects light emitted by each light emitting portion so that reflected light is detected by a corresponding photoreceptor portion, and wherein the reflector member has a plurality of holes to selectively reflect or pass light through according to the relative positions between the detecting devices and the reflector member.

2. The shifting device according to claim 1, wherein each detecting device outputs two different types of signals according to the relative positions between the detecting devices and the reflector member, wherein the holes are formed such that a combination pattern of signals outputted by the detecting devices is changed according to the selected shift position of the shift lever, and wherein the holes are formed such that, even if one of the detecting devices malfunctions, the combination pattern of the signals of the remainder of the detecting devices is changed according to the selected shift position.

3. The shifting device according to claim 2, wherein the holes are formed such that the signals outputted when the shift lever is at a forward position are different from the signals outputted when the shift lever is at a reverse position.

4. The shifting device according to claim 1, wherein the moving mechanism includes a first holder and a second holder, wherein the first holder accommodates one of the plurality of detecting devices and the reflector member and allows the accommodated detecting device or reflector member to move relative to the first holder along the first movement axis, and wherein the second holder accommodates the first holder and allows the first holder to move relative to the second holder along the second movement axis.

5. The shifting device according to claim 4, wherein, when the shift lever is moved along the first manipulation axis, the detecting devices or the reflector member are moved along the first movement axis in the first holder.

6. The shifting device according to claim 5, wherein the first manipulation axis is parallel to the first movement axis.

7. The shifting device according to claim 4, wherein, when the shift lever is moved along the second manipulation axis, the first holder is moved relative to the second holder along the second movement axis.

8. The shifting device according to claim 7, wherein the second manipulation axis is different from the second movement axis.

9. The shifting device according to claim 1, wherein, when the shift lever is moved along the first manipulation axis, the moving mechanism moves at least one of the group of the detecting devices and the reflector member along the first movement axis, and wherein, when the shift lever is moved along the second manipulation axis, the moving mechanism moves at least one of the detecting devices and the reflector member along the second movement axis.

10. The shifting device according to claim 1, wherein, according to movement of the shift lever, the moving mechanism moves one of the plurality of detecting devices and the reflector member relative to the other in a single plane including the first and second movement axes.

11. The shifting device according to claim 10, wherein, according to movement of the shift lever, the moving mechanism moves the reflector member relative to the plurality of detecting devices in the single plane.

* * * * *